(12) United States Patent
Kennedy et al.

(10) Patent No.: US 10,029,204 B2
(45) Date of Patent: Jul. 24, 2018

(54) REGENERATING SIEVE MATERIAL USED FOR PROCESSING NATURAL GAS

(71) Applicant: GE Oil & Gas, Inc., Houston, TX (US)

(72) Inventors: David Allen Kennedy, New Braunfels, TX (US); John Raymond Zigtema, San Antonio, TX (US)

(73) Assignee: GE Oil & Gas, Inc., Houston, TX (US)

( * ) Notice: Subject to any disclaimer, the term of this patent is extended or adjusted under 35 U.S.C. 154(b) by 0 days.

(21) Appl. No.: 14/880,733

(22) Filed: Oct. 12, 2015

(65) Prior Publication Data

US 2017/0100690 A1  Apr. 13, 2017

(51) Int. Cl.
*B01D 53/04* (2006.01)
*B01D 53/26* (2006.01)
*B01J 20/34* (2006.01)
*C10L 3/10* (2006.01)

(52) U.S. Cl.
CPC ....... *B01D 53/0438* (2013.01); *B01D 53/261* (2013.01); *B01J 20/3408* (2013.01); *C10L 3/104* (2013.01); *B01D 2256/245* (2013.01); *B01D 2257/504* (2013.01); *B01D 2257/80* (2013.01); *B01D 2259/40086* (2013.01); *C10L 2290/08* (2013.01); *C10L 2290/12* (2013.01); *C10L 2290/542* (2013.01)

(58) Field of Classification Search
CPC .. B01D 53/04; B01D 53/0438; B01D 53/261; B01D 2256/245; B01D 2257/504; B01D 2257/80; B01D 2259/40086; C10L 3/104; C10L 2290/08; C10L 2290/12; C10L 2290/542

USPC ......... 95/114, 115, 117, 121–127, 139, 148; 96/121, 122, 126–128, 130, 132, 143, 96/146; 585/820

See application file for complete search history.

(56) References Cited

U.S. PATENT DOCUMENTS

| | | | |
|---|---|---|---|
| 3,435,591 A * | 4/1969 | Greathouse | B01D 53/04 95/143 |
| 3,632,504 A * | 1/1972 | Barrere, Jr. et al. | C10G 5/02 208/310 R |
| 3,710,547 A * | 1/1973 | Nelson | B01D 53/04 95/123 |
| 3,894,856 A * | 7/1975 | Lofredo | C07C 7/005 62/614 |
| 5,746,788 A * | 5/1998 | Schmidt | B01D 53/04 48/198.2 |
| 7,449,049 B2 * | 11/2008 | Thomas | B01D 53/0462 423/244.01 |

(Continued)

OTHER PUBLICATIONS

International Search Report and Written Opinion issued in connection with corresponding PCT Application No. PCT/US16/49174 dated Nov. 21, 2016.

*Primary Examiner* — Frank Lawrence

(57) ABSTRACT

A system and process for regenerating sieve materials in a gas processing system. The process can include circulating a cooling gas through sieve material of a first bed, the cooling gas having a first concentration of carbon dioxide ($CO_2$) suitable for liquefaction into a liquid natural gas (LNG) product. The process can also include circulating a regenerating gas through sieve material of a second bed, the regenerating gas having a second concentration of carbon dioxide ($CO_2$) that is greater than the first concentration of carbon dioxide ($CO_2$) of the cooling gas.

20 Claims, 6 Drawing Sheets

(56) References Cited

U.S. PATENT DOCUMENTS

| | | | |
|---|---|---|---|
| 7,575,624 B2 | 8/2009 | Cartwright et al. | |
| 8,337,593 B2 | 12/2012 | Bresler et al. | |
| 2003/0029314 A1* | 2/2003 | Nakamura | B01D 53/02 95/117 |
| 2011/0277496 A1* | 11/2011 | Northrop | B01D 53/0423 62/611 |
| 2014/0224118 A1 | 8/2014 | Zhou et al. | |
| 2014/0357925 A1 | 12/2014 | Mitariten et al. | |

* cited by examiner

REGENERATING SIEVE MATERIAL USED FOR PROCESSING NATURAL GAS

BACKGROUND

Impurities can complicate processing of a feedstock to a useful product. Certain impurities can frustrate stages of purification and, possibly, damage equipment found in a gas processing system. For production of liquid natural gas (LNG), it may be beneficial to reduce concentrations of impurities in the feedstock prior to liquefaction to avoid formation of solids and/or or hydrates.

SUMMARY

The subject matter of this disclosure relates generally to embodiments that can purify a feedstock that comprises hydrocarbons. The embodiments can form "purified" methane (or natural gas) that meets specifications for production of liquid natural gas (LNG) products.

Some embodiments employ multiple beds of sieve materials that can remove impurities from the feedstock. The sieve material may target water as well as any number of impurities that are found in "sour gas" and "acid gas." Examples of these impurities include carbon dioxide ($CO_2$), sulfur and its derivatives, hydrogen sulphides, mercaptan, and the like. Any one of these components can frustrate delivery and use of the end product. For example, sulfur can corrode pipelines. End products with high concentrations of hydrogen sulphides can cause humans to develop significant health problems.

Some embodiments may arrange the beds of sieve materials in stages. Each stage may lower the concentration of one or more impurity to produce the end, purified product. In one implementation, the embodiments can include a "drying" stage to remove water and a "purifying" stage to remove carbon dioxide ($CO_2$) from the feedstock. During processing, the embodiments can direct portions of the streams that exit each of these stages for use to regenerate the sieve material. This process can extend the useful life of the sieve materials. In one implementation, the streams may heat and/or cool the sieve material. For example, the embodiments may use some of the purified methane to cool the beds of sieve material found in the purifying stage. The embodiments may also use some of the dried, unpurified gas to heat and cool the beds of sieve material in both the purifying stage and the drying stage.

These improvements afford the embodiments herein with many capabilities and/or advantages to at least reduce operating costs for the embodiments to generate purified methane that can be readily liquefied to LNG product. For example, the embodiments may use significantly less energy than amine systems (and like solvent-based systems) to reduce concentrations of carbon dioxide ($CO_2$). This feature can be particularly beneficial for small-scale production facilities (e.g., that less than approximately 10 gallons/min) that are impractical for use of amine systems. The embodiments can also operate at significantly lower residue gas requirements for carbon dioxide ($CO_2$) adsorption because the sieve materials do not degrade as rapidly. Further, the embodiments also require only a single blower to maintain pressure of the fluids that regenerate the molecular sieves.

BRIEF DESCRIPTION OF THE DRAWINGS

Reference is now made briefly to the accompanying drawings, in which.

Figure 1:
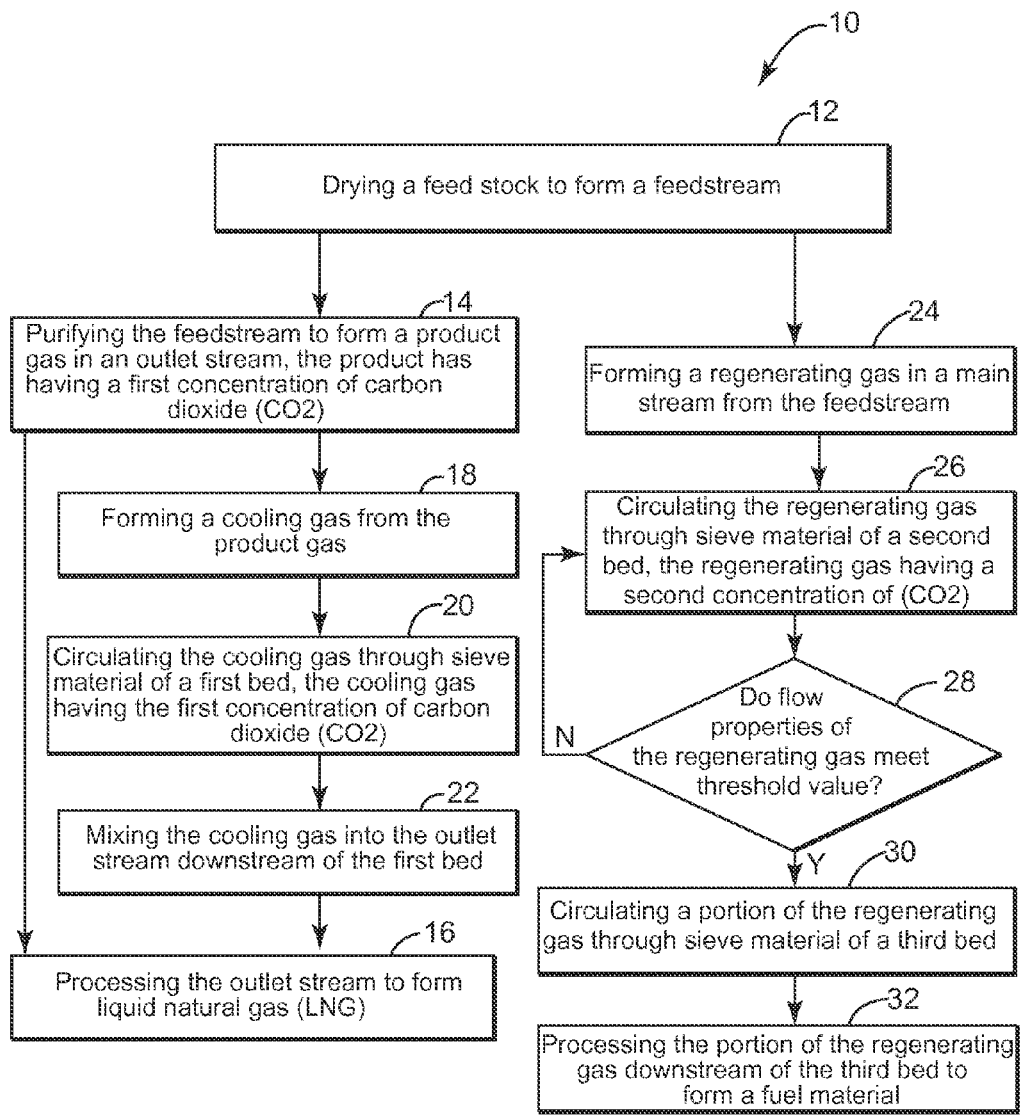
FIG. 1 depicts a flow diagram of an exemplary embodiment of a process to regenerate sieve materials in a gas processing system.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below describes various embodiments to process a feedstock in stages that can generate methane (or natural gas) that meets specifications for liquefaction to liquid natural gas (LNG). The embodiments can be configured with multiple stages that can remove impurities from a water-saturated feedstock (also, "wet" gas) with a concentration of carbon dioxide ($CO_2$) that is less than approximately 2% (20,000 ppmV) and, likely, less than approximately 0.5% (5,000 ppmV). At each stage, the embodiments can bleed-off portions of the resulting stream to heat or cool one or more beds of sieve materials, effectively removing impurities that build up in the sieve materials over time. This feature extends the useful life of the sieve materials. Other embodiments are within the scope of the disclosed subject matter.

The embodiments find use in many different types of processing facilities. These facilities may be found onshore and/or offshore. In one application, the embodiments can incorporate with processing facilities that reside on land, typically on (or near) shore. These processing facilities can process natural gas feedstock from production facilitates found both onshore and offshore. Offshore production facilitates use pipelines to transport feedstock extracted from gas fields and/or gas-laden oil-rich fields, often from deep sea wells, to the processing facilitates. For LNG processing, the processing facility can turn the feedstock to liquid using suitably configured refrigeration equipment or "trains." In other applications, the embodiments can incorporate into production facilities on board a ship (or like floating vessel), also known as a floating liquefied natural gas (FLNG) facility.

Figure 2:
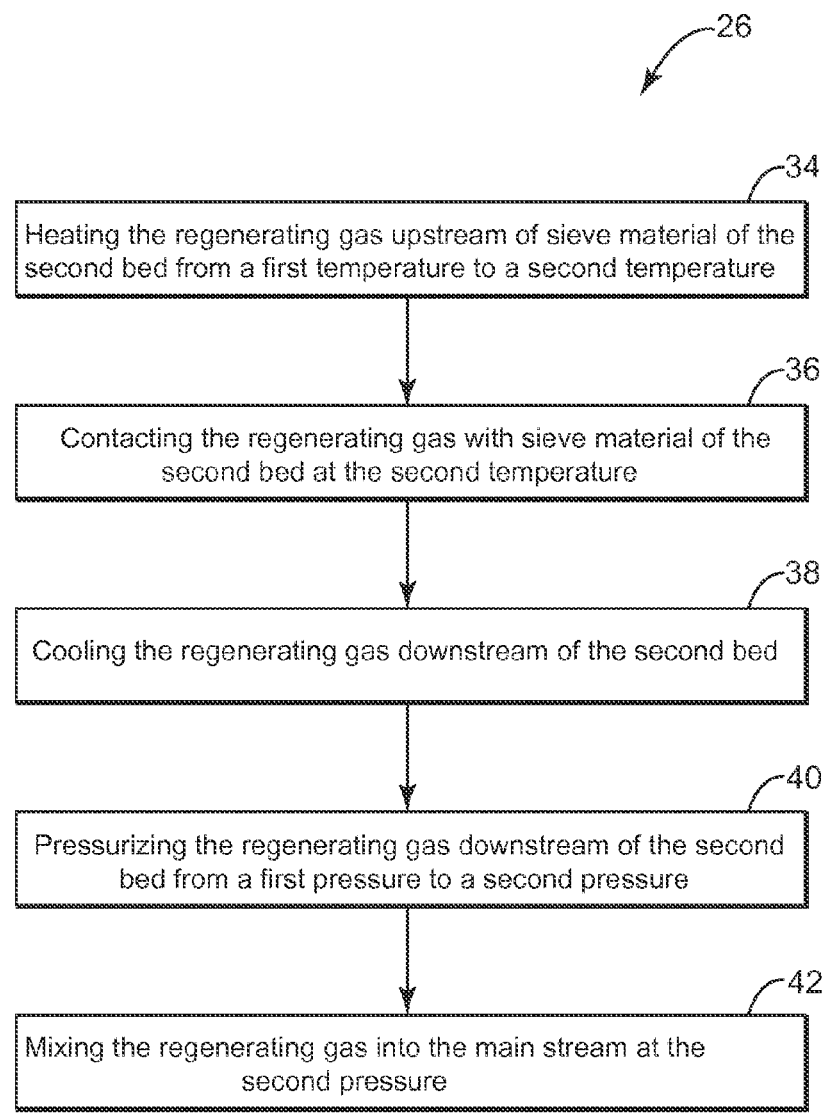
FIG. 2 depicts a flow diagram of an example of the process of FIG. 1.
Figure 3:
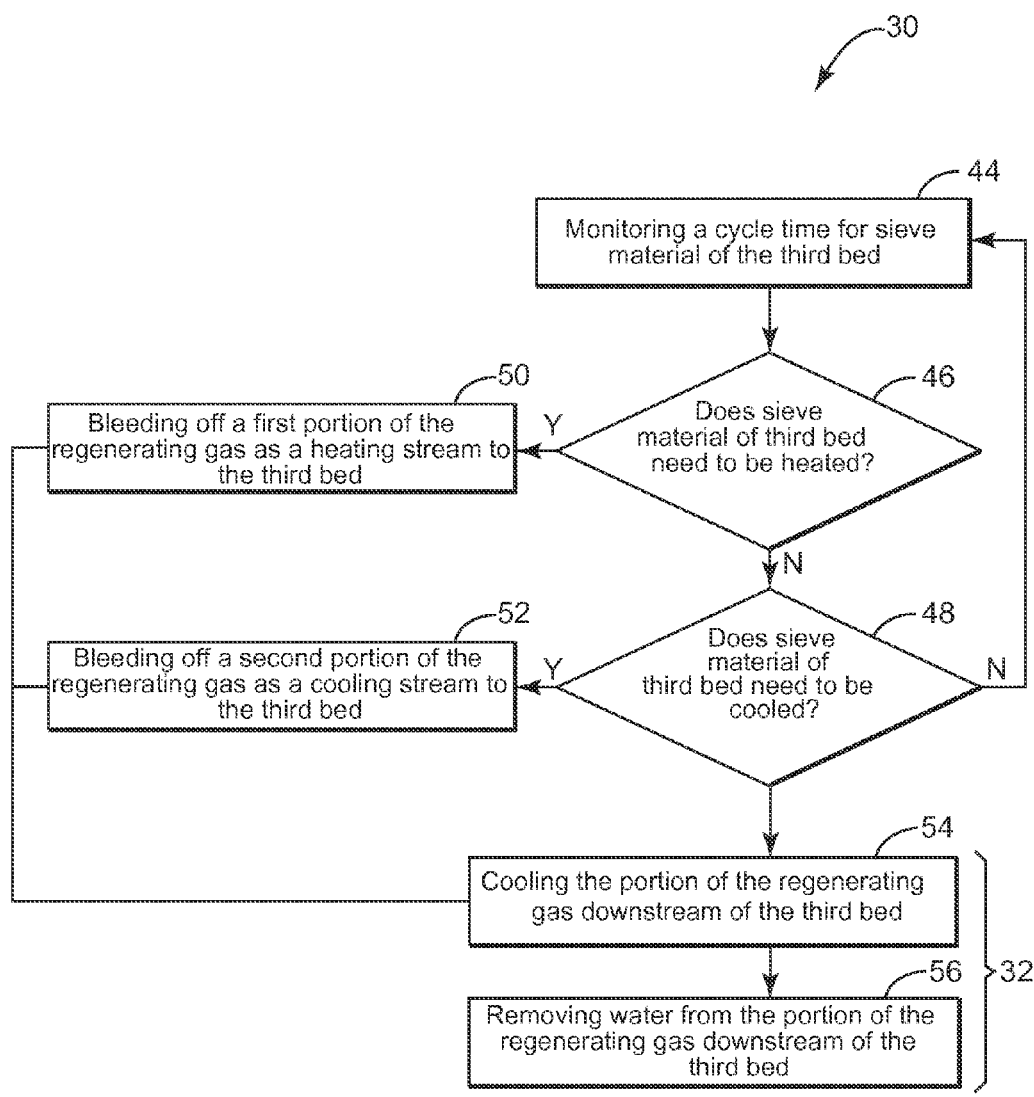
FIG. 3 depicts a flow diagram of an example of the process of FIG. 1.

FIGS. 1, 2, and 3 illustrate flow diagrams of an exemplary embodiment of a process 10 to regenerate sieve material in a gas processing system. At a high level, the process 10 may utilize temperature swing adsorption to remove and/or reduce concentrations of impurities found in sieve materials of various beds of the gas processing system. This mechanism may rely on change in temperature of a "regenerating" stream that flows through the sieve materials. In other implementations, the process 10 may also lend itself to other mechanism, including pressure swing adsorption and/or pressure-concentration swing adsorption. One or more of these mechanisms may rely on variations in pressure of the regenerating stream to effectively remove and/or reduce concentrations of impurities of sieve materials.

Referring first to FIG. 1, the embodiment may include, at stage 12, drying a feedstock to form a feedstream and, at stage 14, purifying the feedstream to form a product gas in an outlet stream. The product gas can have a first concentration of carbon dioxide (CO2) that is suitable for liquefaction to liquid natural gas (LNG). The process 10 can also include, at stage 16, processing the outlet stream to form liquid natural gas (LNG).

The process 10 can also circulate portions of the transient gas for use to heat and cool multiple beds of sieve material. In FIG. 1, the process 10 can include, at stage 18, forming a cooling gas from the product gas and, at stage 20, circulating the cooling gas through sieve material of a first bed, the cooling gas having the first concentration of carbon dioxide (CO2). In one example, the process 10 can include, at stage 22, mixing the cooling gas into the outlet stream downstream of the first bed. For conditioning other beds of sieve material, the process 10 can include, at stage 24, forming a regenerating gas in a main stream from the feedstream. This main stream may bleed off from the feedstream prior to purification (at stage 14). The process 10 can also include, at stage 26, circulating the regenerating gas through sieve material of a second bed. The regenerating gas can have a second concentration of carbon dioxide (CO2) that is greater than the first concentration of carbon dioxide (CO2) in the cooling gas. In one implementation, the process 10 can include, at stage 28, determining a relationship between a flow property of the regenerating gas and a threshold value and, at stage 30, circulating a portion of the regenerating gas through sieve material of a third bed in accordance with the relationship. The regenerating gas may reach a designated pressure before the portion circulates to the third bed. The process 10 can further include, at stage 32, processing the portion of the regenerating gas downstream of the third bed to form a fuel material and/or fuel additive. Notably, the resulting fuel may have a concentration of carbon dioxide (CO2) that varies too much during operation of the process 10 for immediate use as fuel. In such case, the resulting fuel material can be blended with other gasses or liquids and/or sent to holding tank, each stage being useful to effectively regulate the average concentration of carbon dioxide (CO2) to approximately 10% (100,000 ppmV).

Turning also to FIG. 2, the process 10 can be configured with stages to condition the regeneration gas to draw off carbon dioxide (CO2) from the sieve material in the second bed. This carbon dioxide (CO2) typically builds up during purifying of the feedstream. In one implementation, the process 10 can include, at stage 26, various stages to heat and cool the regeneration gas in order to recycle the regenerating gas in the main stream. At stage 34, the process 10 can include heating the regenerating gas upstream of sieve material of the second bed from a first temperature to a second temperature. The process 10 can also include, at stage 36, contacting the regenerating gas with sieve material of the second bed at the second temperature. The process 10 can further include, at stage 38, cooling the regenerating gas downstream of the second bed and, at stage 40, pressurizing the regenerating gas downstream of the second bed from a first pressure to a second pressure. The process 10 can also include, at stage 42, mixing the regenerating gas into the main stream at the second pressure.

FIG. 3 illustrates additional stages for use to bleed-off the portion of the regenerating gas to the third bed (at stage 30). The process 10 can include, at stage 44, monitoring a cycle time for sieve material of the third bed and, at stages 46 and 48, determining whether the sieve material of the third bed needs to be heated or cooled. In addition to the cycle time, the process 10 could utilize stages to monitor sensor values that indicate concentration of carbon dioxide (CO2), as well as other modalities for quantifying the efficacy of the sieve material of the third bed. If the third bed is to be heated, the process 10 can include, at stage 50, bleeding off a first portion of the regenerating gas as a heating stream to the third bed. On the other hand, if the third bed is to be cooled, the process 10 can include, at stage 52, bleeding off a second portion of the regenerating gas as a cooling stream to the third bed. The process can also include, at stage 54, cooling the portion of the regenerating gas downstream of the third bed and, at stage 56, removing water from the portion of the regenerating gas downstream of the third bed.

The discussion now turns to systems (and/or "apparatus") that can implement the process 10 to regenerate beds of sieve materials. The systems can be configured to circulate the feedstream and product gases for use to heat and/or cool the beds. At a high level, such configuration utilize various equipment, including reactors, reactor vessels, heaters, exchangers, separators, pipes, pumps, compressors, valves, and controllers. This equipment can be arranged variously to regulate the flow of fluid (e.g., gas) at certain properties (e.g., temperature, pressure, flow rate, etc.). Thus, while the disclosed subject matter identifies certain arrangements below, other arrangements that can implement one or more stages of the process 10 (and its derivations and embodiments) are within the scope of the disclosed subject matter.

Figure 4:
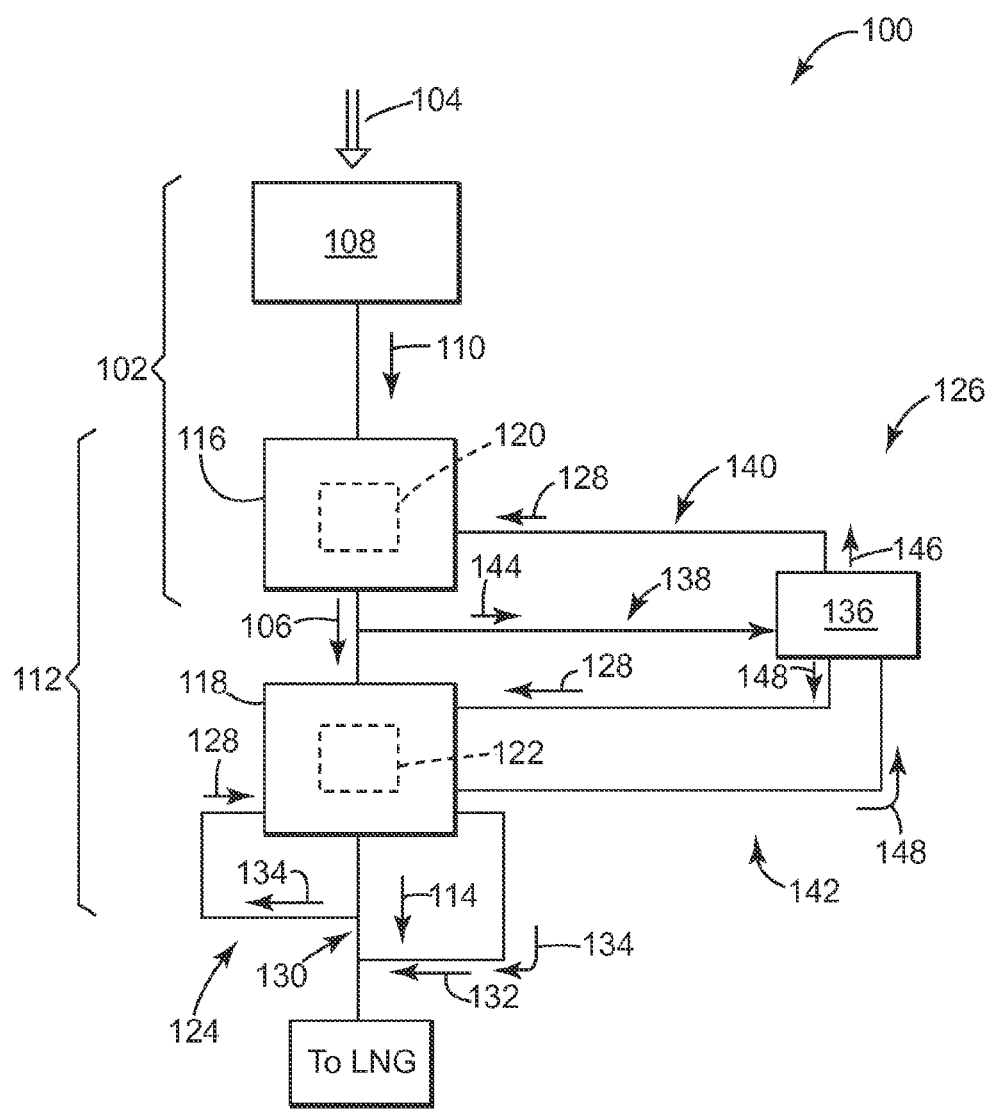
FIG. 4 depicts a schematic diagram of an exemplary embodiment of a system that can process an incoming natural gas feed to generate a product that meets specifications for liquefaction to liquid natural gas (LNG)

FIG. 4 depicts a schematic diagram of an exemplary embodiment of a system 100 for processing natural gas. This embodiment includes a conditioning unit 102 that conditions a feedstock 104 into a feedstream 106. Examples of the feedstock 104 can include natural gas or methane with certain levels of impurities. In one implementation, the conditioning unit 102 can include a pre-treatment unit 108, preferably designed to remove water from the "wet" gas to form a feedstream 110 having a concentration of water that is less than approximately 0.0001% (1 ppmV), and in one example approximately 0.00001% (0.1 ppmV). The system 100 can direct the feedstream 110 to a removal unit 112. The removal unit 112 can process the feedstream 110 to form an outlet stream of a product 114 that meets specifications for liquefaction to liquid natural gas (LNG). The product 114 is typically vapor with a composition that is predominantly methane, for example, in a range from approximately 84% (or 840,000 ppmV) to approximately 99% (or 990,000 ppmV).

The removal unit 112 can be configured so that the concentration of impurities in the composition of the product 114 meets specifications for liquefaction to liquid natural gas (LNG). These configurations can have one or more stages (e.g., a first stage 116 and a second stage 118). In one implementation, the stages 116, 118 can utilize molecular sieve (and/or similar "sieve materials") with properties that are conducive to remove a target impurity from an incoming stream. Nominally, suitable sieve materials can be a class of aluminosilicates and relates molecular sieves. Other compositions like activated carbons, activated clays, silica gels, activated aluminas, zeolites may also work to adsorb impurties as contemplated herein. Aluminosilicates may exhibit very high water capacity to produce low water dew-points, and can often be used to both dry and sweeten fluids. Many aluminosilicates can be manufactured or occur naturally to exhibit a degree of selectivity based on crystalline structure in their adsorption of natural gas constituents or impurities.

For purposes of the example below, the target impurities can include water and carbon dioxide (CO2). However, this disclosure does contemplate that some embodiments can be configured with sieve materials according to one or more of the target impurities found in the feedstock 104 (and/or the feedstream 106).

In the first stage 116, the removal unit 112 can be configured to further remove liquid from the incoming feedstream 110. These configurations can include a drying unit 120 with sieve materials that adsorb water. Exemplary sieve materials can include In one implementation, the feedstream 110 enters the drying unit 120 with a first concentration of water at approximately 0.015% (150 ppmV) or less and, in one example, in a range of approximately 0.125% (1,250 ppmV) to approximately 0.21% (2,100 ppmV). For saturated gas, the concentration may depend on temperature and pressure of the incoming feedstock. Processing in the drying unit 120 can form the feedstream 106, preferably with a second concentration of water at no more than 0.0001% (1 ppmV) and, in one example, in a range from approximately 0.00001% (0.1 ppmV) to approximately 0.0001% (1 ppmV).

The removal unit 112 can be configured in the second stage 118 to "purify" the incoming feedstream 106. These configurations can include an adsorber unit 122 with sieve materials that adsorb carbon dioxide ($CO_2$). These sieve materials may be selected based on preferred pressure drop through the bed. In one implementation, the feedstream 106 enters the adsorber unit 122 with a first concentration of carbon dioxide (CO2) of approximately 0.5% (5,000 ppmV) and, in one example, in a range from approximately 0.5% (5,000 ppmV) to approximately 2% (20,000 ppmV). Processing in the adsorber unit 122 can result in the product 114 with a second concentration of carbon dioxide ($CO_2$) of 0.005% (50 ppmV) or less and, often, in a range of from approximately 0% (0 ppmV) to approximately 0.005% (50 ppmV). The product 114 may be ready for liquefaction to LNG.

The system 100 can be configured to regenerate the sieve materials of the units 120, 122 to extend the useful life. These configurations may utilize one or more circulation circuits (e.g., a first circulation circuit 124 and a second circulation circuit 126). At a high level, the circulation circuits 124, 126 can be configured to distribute a regenerating stream 128 to the units 120, 122. The regenerating stream 128 can heat and/or cool the sieve materials, as desired. Thermal changes in the sieve materials can effectively prepare the units 120, 122 to process the feedstream 110 (at the drying unit 120) and/or the feedstream 106 (at the adsorber unit 122) to generate the product 114 as noted above.

The first circulation circuit 124 can be configured to distribute the regenerating stream 128 to the adsorber unit 122. In one configuration, the first circulation circuit 124 can couple downstream of the adsorber unit 122 at more than one location (e.g., a first location 130 and a second location 132). This configuration forms a closed loop that can cycle a portion of the product 114 to cool the adsorber unit 122.

At the first location 130, the closed loop can direct the portion of the product 114 as a cooling stream 134 to the adsorber unit 122. The cooling stream 134 can interact with sieve material in the adsorber unit 122 to draw off heat (or, more generally, thermal energy). This feature readies the adsorber unit 122 at temperatures to adsorb impurities found in the feedstream 106. These temperatures may be within approximately 15° C. of the incoming feedstream 106, although these values may depend on the properties of sieve material and/or other considerations. For the system 100, values for the temperatures may depend on the ambient operating pressure. It is reasonable, for example, for the system 100 to require temperatures of approximately 300° C. or less and, in one example, in a range from approximately 200° C. to approximately 300° C.

The second location 132 can be downstream of the first location 130. At the second location 132, the closed loop can direct the cooling stream 134 back into the outlet stream of the product 114. The first circulation circuit 124 may be configured to reduce the temperature of the cooling stream 134 between the adsorber unit 122 and the second location 132. These configurations may include components (e.g., coolers) to remove heat that the cooling stream 134 picks up at the adsorber unit 122. In use, the components can reduce the temperature of the cooling stream 134 as between a first temperature and a second temperature that is lower than the first temperature. Where applicable, the second temperature can be consistent with the temperature of the product 114 in the outlet stream. In connection with the discussion above, the second temperature of the cooling stream 134 may be in a range of from approximately 10° C. to approximately 15° C. above ambient temperature of the system 100.

The second circulation circuit 126 can be configured to distribute the regenerating stream 128 to the stages 116, 118. This configuration can facilitate regeneration of sieve material in each of the drying unit 120 and the adsorber unit 122. In one configuration, the second circulation circuit 126 can have a regeneration unit 136 and one or more regeneration paths (e.g., a first regeneration path 138, a second regeneration path 140, and a third regeneration path 142). Each of the paths 138, 140, 142 couple the regeneration unit 136 with the removal unit 112.

The first path 138 can direct a portion of the feedstream 106 in a main stream of regeneration gas 144 to the regeneration unit 136. The regeneration unit 136 can be configured to operate on the regeneration gas 144. These configurations may include "lines" that are equipped with pipes (and/or conduits), valves, and related process components to generate a pair of streams (e.g., a first stream 146 and a second stream 148). These components can maintain the streams 146, 148 at temperatures that are suited to heat and/or cool one or both of the units 120, 122, as noted herein.

The second path 140 can carry the first stream 146 to the drying unit 120. The regeneration unit 136 can provide the first stream 146 at temperatures that comport with either heating or cooling sieve material in the drying unit 120. In one implementation, the temperatures may vary between a first temperature and a second temperature, one each for heating and cooling of sieve materials, respectively. For heating, the first temperature can be in a range of from approximately 200° C. to approximately 300° C. Cooling may require the second temperature to be in a range of from approximately 50° C. to approximately 75° C.

The third path 142 can form a loop that circulates the second stream 148 between the adsorber unit 122 and the regeneration unit 136. In one implementation, the second stream 148 can act as a carrier gas. The loop can be configured to contact the carrier gas with sieve material to purge carbon dioxide (CO2) from sieve material of the adsorber unit 122. Cooling may not be required because the system 100 uses the closed loop of the first circulation circuit 124 to cool sieve material in the adsorber unit 122 prior to introduction of the carrier gas to the sieve material. The carrier gas can enter the adsorber unit 122 at a first temperature, preferably at least approximately 20° C. hotter than the temperature of the sieve material that results from heating using the carrier gas.

The loop of the third path 142 can be configured to direct the CO2-rich carrier gas 148 from the adsorber unit 122 to the regeneration unit 136. This configuration may include components (e.g., coolers, compressors, etc.) to condition the CO2-rich carrier gas between the adsorber unit 122 and the regeneration unit 136. In one implementation, the regeneration unit 136 can mix the carrier gas with the regeneration gas 144 for use as the streams 146, 148. The components of the loop may be used to reduce the temperature of the carrier gas to comport with the temperature of the regeneration gas 144. These temperatures may be at approximately 50° C. The components may be configured to raise the pressure to the pressure of the regenerating gas 144. This pressure may be approximately 30 psi; however this disclosure does recognize that the pressure can vary based on ambient conditions and/or other operating factors.

Figure 5:
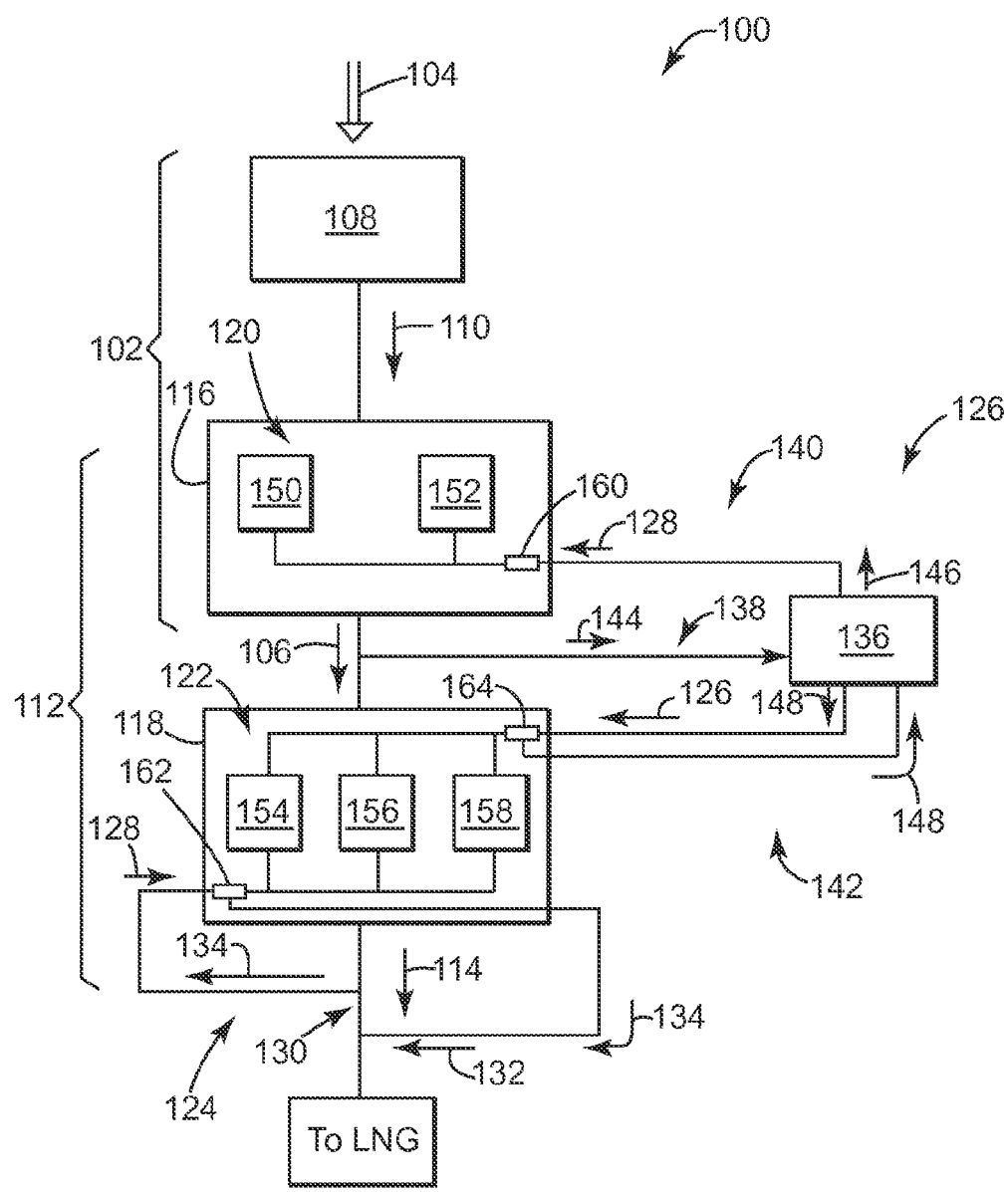
FIG. 5 depicts an example of the system of FIG. 4.

FIG. 5 illustrates a schematic diagram of an example of the system 100. For some embodiments, each of the units 120, 122 may have multiple beds of sieve materials. The number of beds may vary to accommodate the levels of water and impurities found in the incoming feedstock 104. In one implementation, the drying unit 120 includes one or more drying beds (e.g., a first drying bed 150 and a second drying bed 152). The adsorber unit 122 can include one or more adsorber beds (e.g., a first adsorber bed 154, a second adsorber bed 156, and a third adsorber bed 158). The system 100 can also include a control unit with one or more fluid directing units (e.g., a first fluid directing unit 160, a second fluid directing unit 162, and a third fluid directing unit 164).

At a high level, the control unit can change the configuration of the system 100 to manage regeneration of sieve materials in the beds. Normal operation of the system 100 may bring one of the drying beds 150, 152 and one of the adsorber beds 154, 156, 158 on-line to process the incoming feedstock 104. The control unit can direct the incoming regenerating streams 128 to the off-line beds to prepare sieve materials in these beds for service in the purifying process.

At the drying unit 120, the first fluid directing unit 160 operates to direct the first stream 146 to the off-line bed of the drying beds 150, 152. The regeneration unit 136 may be configured to change the temperature of the first stream 146 to effectuate either heating or cooling of the sieve material in the off-line bed. In one implementation, the cycle time to regenerate the drying beds 150, 152 may measure upward of approximately twelve (12) hours. During this time period, the regeneration unit 136 is configured so that the temperature for the first stream 146 is configured for heating for approximately seven (7) hours and is configured for cooling for approximately five (5) hours.

The fluid directing units 162, 164 can operate to distribute the cooling stream 134 and the second or "heating" stream 148 to the off-line beds of the adsorber beds 154, 156, 158. In one implementation, the adsorber unit 122 cycles rapidly between on-line and off-line beds. Cycle times may be as a little as one (1) hour. During this time period, the control unit can be configured so that one of the off-line beds is cooling and the other of the off-line beds is heating.

Figure 6:
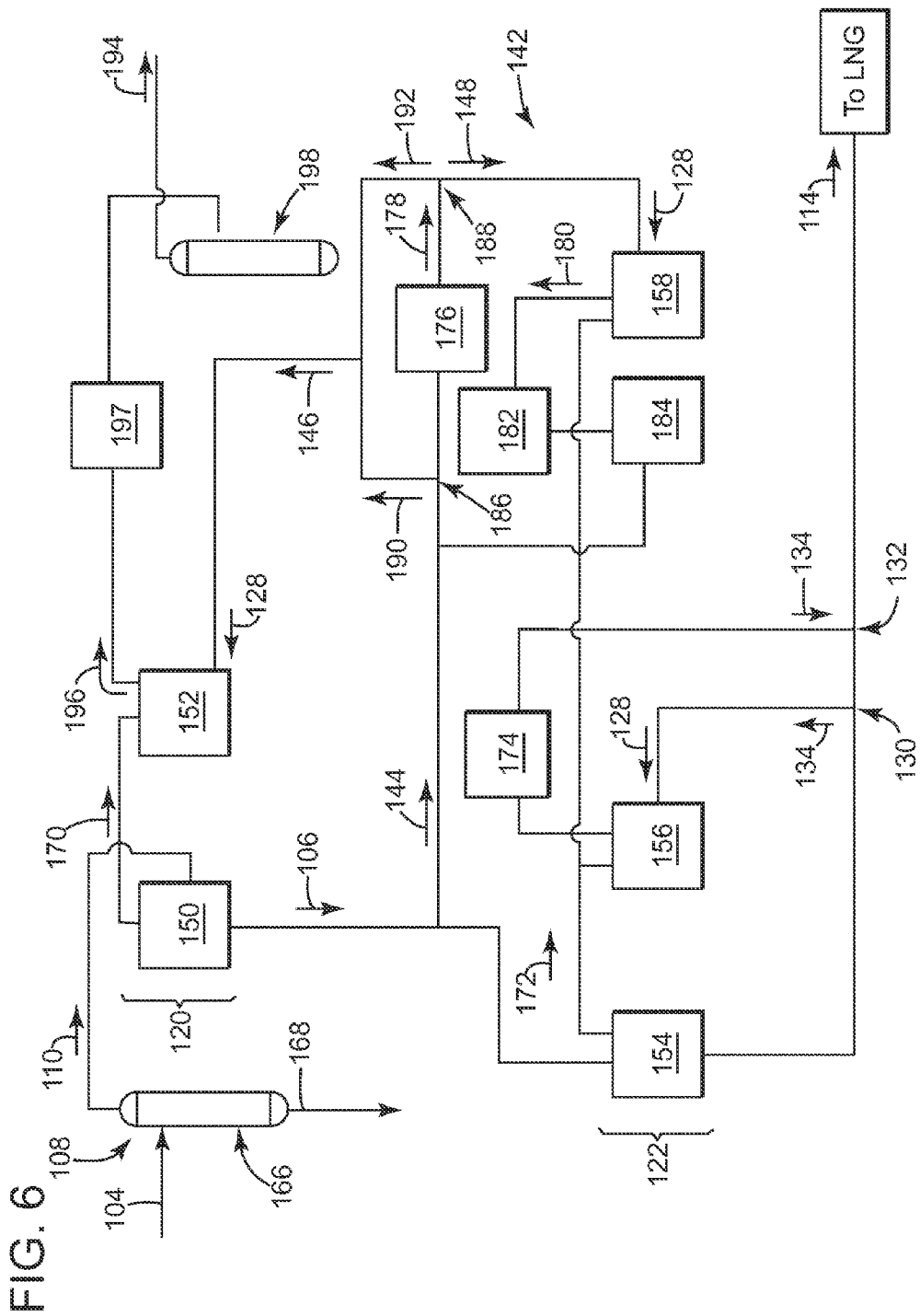
FIG. 6 depicts an example of the system of FIG. 4.

FIG. 6 is a schematic diagram of an example of the system 100 in a first regeneration configuration. The control unit can change the configuration using the various fluid directing units 160, 162, 164 (FIG. 5) in accordance with the cycle time necessary to maintain performance of sieve materials in the beds. In this example, the system 100 embodies a "five bed system" to remove water and carbon dioxide (CO2) from the incoming plant feed gas 104. This system 100 dedicates beds 150, 152 to remove water and beds 154, 156, 158 to remove carbon dioxide (CO2). In the first regeneration configuration, the beds 150, 154 are "on-line" to process the incoming plant feed gas 104. The beds 152, 156, 158 are "off-line" and, in turn, subject to regeneration. In particular, the system 100 is configured to cool sieve material of the bed 156 and to heat sieve material of the bed 158. As noted more below, the system 100 is further configured to heat or cool the bed 152 depending on operative portion of the processing cycle.

Starting at the upper left of the diagram, the incoming feedstock 104 passes through an inlet separator 166 of the pre-treatment unit 108 to remove free water, as generally identified by the arrow enumerated 168. The free water 168 can damage sieve materials in the drying beds 150, 152. The gas 110 exits the inlet separator 166 to the drying unit 120. In one implementation, the inlet separator 166 is configured so that the concentration of water in the gas 110 is in a range from approximately 0.15% (150 ppmV) to approximately 2.1% (2,100 ppmV).

The gas 110 can flow to one of the drying beds 150, 152. The drying beds 150, 152 can operate on twelve (12) hour cycles with one bed on-line (e.g., the first drying bed 150) and the other bed off-line (e.g., the second drying bed 152). The regeneration process may include one heating cycle of seven (7) hours and one cooling cycle of five (5) hours. The system 100 can be configured to modulate the control unit and/or the fluid directing unit 160 (FIG. 5) to change the beds 150, 152 between on-line and off-line when the molecular sieves reach capacity of accumulated water 170.

The feedstream 106 can exit the on-line bed to one of the adsorber beds 154, 156, 158. As noted above, the adsorber beds 154, 156, 158 can operate on a one (1) hour cycle with one bed on-line (e.g., the first adsober bed 154), one bed cooling (e.g., the second adsorber bed 156), and one bed heating (e.g., the third adsorber bed 158). The system 100 can be configured to modulate the flow control and/or the fluid directing units 162, 164 (FIG. 5) to change the beds 154, 156, 158 between on-line and off-line when sieve materials reach capacity of carbon dioxide (CO2) 172.

Dried, purified gas 114 leaves the on-line bed 154 of the adsorber unit 122 in the form of the outlet stream of gas that is ready for liquefaction to liquid natural gas (LNG). The system 100 diverts a portion of the dried, purified gas 114 as the cooling gas 134 to the off-line bed 156. In one implementation, the off-line bed 156 has been heated and needs to be cooled prior to the system 100 coupling it on-line, e.g., via the fluid directing unit 162 (FIG. 5). As the cooling gas 134 contacts sieve material of the off-line bed 156, it picks up heat and must be cooled prior to mixing with the outlet stream of the dried, purified gas 114. In one example, the cooling gas 134 passes through an air cooler 174 disposed between the on-line bed 154 and the second location 132.

Between the units 120, 122, the system 100 can divert a portion of the feedstream 106 that exits the on-line bed 150. This portion forms the regeneration gas 144 that the system 100 can use to regenerate the off-line beds 152, 158. In one implementation, the system 100 can form a regeneration gas circuit to condition the regeneration gas 144 for use to heat sieve materials of the off-line beds 152, 158. The regeneration gas circuit can include a heater 176 to heat the regeneration gas 142. The heated gas 178 that exits the heater 176 can flow to the adsorber unit 122 via the third regeneration path 142 to heat the off-line bed 158. As noted above, the third regeneration path 142 can be configured to cause the heated gas 178 to contact sieve material in the off-line bed 158. This configuration forms an exit gas 180 that is rich in carbon dioxide (CO2) and at elevated temperature downstream of the off-line bed 158.

The regeneration gas circuit can form a closed loop to mix the CO2-rich exit gas 180 back into the regeneration gas 144. In one implementation, CO2-rich exit gas 180 may pass through a cooler 182 to reduce the temperature of the CO2-rich exit gas 180 to ambient temperature, possibly at or greater than approximately 50° C. A blower 184 may be used to pressurize the cooled CO2-rich exit gas 180 to overcome pressure loss that can accumulate through, e.g., the off-line bed 158, the heater 176, and the cooler 182. Suitable devices for use as the blower 184 may accommodate an accumulated pressure loss of approximately 20 psi, although the accumulated pressure loss may vary upwards and downwards in accordance with the configuration of equipment found in the system 100. In one example, the system 100 may be configured to cool the compressed gas downstream of the blower 184 before it mixes with the regenerating gas 144.

The system 100 may be configured so that the flow rate of the regeneration gas 144 is different from the flow rate of carbon dioxide (CO2) in the incoming feedstock 104. In one example, the flow rate of the regeneration gas 144 is at least nine (9) times the flow rate of carbon dioxide (CO2) in the incoming feedstock 104. A minimum flow rate for the regeneration gas 144 may be required because desorption from sieve materials in the offline beds will vary with concentrations of carbon dioxide (CO2). Preferably, the concentration of carbon dioxide (CO2) will vary between approximately 0% (0 ppmV) and approximately 20% (200,000 ppmV). Concentrations above 20% can render the regenerating gas 144 unable to pick up any additional carbon dioxide (CO2). In one implementation, the minimum flow rate of the regeneration gas 144 can depend on the average concentration of carbon dioxide (CO2). In one implementation, the flow rate is configured so the regeneration gas circuit can heat the off-line adsorber bed 158 to approximately 300° C. within the heating cycle (e.g., one (1) hour adsorption time). To accommodate this short heating cycle, the system 100 may benefit from internally insulating the adsorber beds 154, 156, 158 to avoid extra time necessary to heat and cool peripheral structure (e.g., vessel walls). In one implementation, all of the beds 150, 152, 154, 156, 158 will be insulated, either internally, externally, or both.

The system 100 may also include a bleed-off circuit to direct a portion of the regeneration gas 144 to heat and/or cool sieve material of the off-line bed 152. This bleed-off circuit can couple with the regeneration gas circuit, as generally denoted by one or more tee locations (e.g., a first tee location 186 and a second tee location 188). The tee locations 186, 188 may reside in positions on the suction side and the discharge side of the heater 176, respectively. These positions are important to effectuate either heating or cooling of the off-line bed 152. At the first tee location 186, the bleed-off circuit couples with the regeneration gas circuit on the suction side of the heater 176. This configuration can capture regeneration gas 144 before the heater 176 to provide a cooling gas 190 to the off-line bed 152. At the second tee location 188, the bleed-off circuit couples with the regeneration gas circuit at the discharge side of the heater 176 to provide a heating gas 192 to the off-line bed 152. The balance of the heated gas 178 is used (as the second stream 148) to heat the off line bed 158. Flow properties of the gases 190, 192 that bleed off can limit the concentration of carbon dioxide (CO2) in the regeneration gas circuit.

Operation of the system 100 can allow the regeneration gas 144 to "build-up" in the regeneration gas circuit before either the cooling gas 192 or the heating gas 194 are bled-off to the off-line bed 152. These configurations may monitor flow properties (e.g., flow rate, pressure, etc.) of the regenerating gas 144 in the regeneration gas circuit. When the flow of gas on regeneration gas circuit reaches the appropriate properties, the system 100 can then operate flow control devices at the tee locations 188, 190 to heat or cool the off-line bed 152. In one implementation, the system 100 will be configured to provide the heating gas 192 the appropriate cycle time, e.g., for seven (7) hours and cooling gas 190 for five (5) hours. Notably, the system 100 can be configured for regeneration of the off-line bed 152 to occur at lower pressures. This configuration can accommodate a minimum pressure drop through the off-line bed 152 in order to distribute the gasses 190, 192 evenly. If the minimum pressure is not maintained, channeling can occur that can reduce efficacy of the gasses 190, 192 and, in turn, cause inadequate and/or uneven regeneration of portions of sieve materials of the off-line bed 152.

The system 100 may be configured to recover a useable product 194 in addition to the product 114. Examples of the useable product 194 can include fuel (or "fuel gas") that augments requirements of the plant or facility that houses the system 100. In one implementation, the system 100 can direct an exit gas 196 from the off-line bed 152 to a conditioning unit, shown here to include a cooler 197 and a knock-out drum 198. The cooler 197 can reduce the temperature of the exit gas 196 to approximately 50° C. or, where applicable, ambient temperature. The knock-out drum 198 can remove the water in the cooled, exit gas 196. In one implementation, the system 100 may include a heater downstream of the knock-out drum 198 to raise the temperature of the cooled, exit gas 196, often in response to pressure changes.

As used herein, an element or function recited in the singular and proceeded with the word "a" or "an" should be understood as not excluding plural said elements or functions, unless such exclusion is explicitly recited. Furthermore, references to "one embodiment" should not be interpreted as excluding the existence of additional embodiments that also incorporate the recited features.

This written description uses examples to disclose the embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A process for regenerating sieve material in a gas processing system, said process comprising:
    circulating a cooling gas through sieve material of a first bed, the cooling gas having first concentration of carbon dioxide (CO2) suitable for liquefaction into a liquid natural gas (LNG) product;
    circulating a regenerating gas through sieve material of a second bed, the regenerating gas having a second concentration of carbon dioxide (CO2) that is greater than the first concentration of carbon dioxide (CO2) of the cooling gas; and
    circulating a portion of the regenerating gas through sieve material of a third bed.

2. The process of claim 1, further comprising:
purifying a feedstream to form a product gas in an outlet stream, the product gas having the first concentration of carbon dioxide (CO2); and
forming the cooling gas from the product gas.

3. The process of claim 2, further comprising:
mixing the cooling gas into the outlet stream downstream of the first bed.

4. The process of claim 2, further comprising:
cooling the cooling gas downstream of the first bed.

5. The process of claim 2, further comprising:
forming the regenerating gas in a main stream from the feedstream;
heating the regenerating gas upstream of the second bed from a first temperature to a second temperature; and
contacting the regenerating gas with sieve material of the second bed at the second temperature.

6. The process of claim 5, further comprising:
cooling the regenerating gas to the first temperature downstream of the second bed.

7. The process of claim 5, further comprising:
pressurizing the regenerating gas downstream of the second bed from a first pressure to a second pressure; and
mixing the regenerating gas into the main stream at the second pressure.

8. The process of claim 1,
wherein circulating the portion of the regenerating gas through sieve material of the third bed is in accordance with a relationship, wherein the relationship is determined between a flow property of the regenerating gas and a threshold value.

9. The process of claim 8, wherein the portion is configured at a temperature to heat sieve material of the third bed.

10. The process of claim 8, wherein the portion is configured at a temperature to cool sieve material of the third bed.

11. The process of claim 2, further comprising
drying a feedstock to form the feedstream; and
forming the regenerating gas from the feedstream.

12. A system for treating natural gas, said system comprising:
an adsorber unit with sieve material in a first bed and a second bed configured to remove carbon dioxide (CO2) from a gas; and
a circulation system coupled with the adsorber unit, the circulation system having,
a first circulation circuit coupled downstream of the adsorber unit in a location to divert a cooling gas to the first bed of sieve material, the cooling gas having a first concentration of carbon dioxide (CO2) suitable for liquefaction into a liquid natural gas (LNG) product,
a second circulation circuit coupled upstream of the adsorber unit in a location to divert a regenerating gas to a second bed, the regenerating gas having a second concentration of carbon dioxide (CO2) that is greater than the first concentration of carbon dioxide (CO2) of the cooling gas; and
a third circulation circuit downstream of the second circulation circuit to circulate a regeneration gas through sieve material of a third bed.

13. The system of claim 12, further comprising:
a drying unit with sieve material in the third bed that is configured to remove water from the gas, wherein the second circulation circuit couples with the drying unit to divert the regenerating gas to the third bed.

14. The system of claim 13, further comprising:
a bleed off circuit coupled with the second circulation circuit at a first location and a second location, wherein the bleed off circuit is configured to divert the regenerating gas to the third bed at a first temperature and a second temperature that is different from the first temperature, one each corresponding with the first location and the second location.

15. The system of claim 12, wherein the first circulation circuit forms a first loop to return the cooling gas to an outlet stream that is configured with a product gas having the first concentration of carbon dioxide (CO2).

16. The system of claim 15, wherein the first loop comprises a cooler downstream of the first bed.

17. The system of claim 12, wherein the second circulation circuit forms a second loop that couples with the second bed to return the regenerating gas to a main stream, and wherein the closed loop comprises a conditioning unit disposed downstream of the second bed and coupled with the second recirculation circuit, the conditioning unit configured to lower temperature and increase pressure of the regenerating stream downstream of the second be and upstream of the main stream.

18. A system, comprising:
a plurality of beds of sieve material, the plurality of beds of the sieve material configured to remove water and carbon dioxide (CO2) from a gas;
a first fluid circuit configured to provide a cooling gas to a first bed, the cooling gas having a first concentration of carbon dioxide (CO2) suitable for liquefaction into a liquid natural gas (LNG) product;
a second fluid circuit configured to provide a regenerating gas to a second bed, the regenerating gas having a second concentration of carbon dioxide (CO2) that is greater than the first concentration of carbon dioxide (CO2) of the cooling gas; and
a third fluid circuit to circulate a regeneration gas through sieve material of a third bed.

19. The system of claim 18, further comprising:
the third fluid circuit being configured to divert the regenerating gas to the third bed.

20. The system of claim 19, wherein the third fluid circuit couples with the second fluid circuit at a first location and a second location, wherein the regenerating gas has a first temperature at the first location and a second temperature at the second location, and wherein the first temperature is different from the second temperature.

* * * * *